(12) United States Patent
Gallery (10) Patent No.: US 6,285,379 B1
(45) Date of Patent: Sep. 4, 2001

(54) VIRTUAL BODY CONTROL DEVICE

(75) Inventor: Richard D. Gallery, Honley (GB)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 08/764,701

(22) Filed: Dec. 4, 1996

(30) Foreign Application Priority Data

Dec. 7, 1995 (GB) .................................................. 9525047

(51) Int. Cl.[7] .................................................. G06T 15/00
(52) U.S. Cl. .................................................. 345/473
(58) Field of Search .................................. 345/473, 419, 345/433, 474

(56) References Cited

U.S. PATENT DOCUMENTS

| | | | |
|---|---|---|---|
| 4,937,444 | | 6/1990 | Zimmerman ........................ 250/231.1 |
| 4,988,981 | * | 1/1991 | Zimmerman et al. ................ 345/158 |
| 5,214,758 | * | 5/1993 | Ohba et al. ........................... 345/473 |
| 5,347,306 | * | 9/1994 | Nitta ........................................ 348/15 |
| 5,436,638 | * | 7/1995 | Bolas et al. .......................... 345/156 |
| 5,459,382 | * | 10/1995 | Jacobus et al. .................. 318/568.11 |
| 5,483,630 | * | 1/1996 | Unuma et al. ....................... 345/475 |
| 5,490,784 | * | 2/1996 | Carmein ................................. 434/55 |
| 5,536,225 | * | 7/1996 | Neuberg et al. ....................... 482/71 |
| 5,554,033 | * | 9/1996 | Bizzi et al. ........................... 434/247 |
| 5,577,981 | * | 11/1996 | Jarvik ..................................... 482/4 |
| 5,587,937 | * | 12/1996 | Massie et al. ......................... 364/578 |
| 5,619,180 | * | 4/1997 | Massimino et al. ............... 340/407.1 |
| 5,629,594 | * | 5/1997 | Jacobus et al. .................. 318/568.11 |
| 5,631,861 | * | 5/1997 | Kramer ................................. 364/806 |
| 5,659,691 | * | 8/1997 | Durward et al. .................... 345/329 |
| 5,669,818 | * | 9/1997 | Thorner et al. ........................ 463/30 |
| 5,696,892 | * | 12/1997 | Redmann et al. .................... 345/425 |
| 5,709,219 | * | 1/1998 | Chen et al. ........................... 600/453 |
| 5,737,505 | * | 4/1998 | Shaw et al. .......................... 345/419 |
| 5,739,811 | * | 4/1998 | Rosenberg et al. .................. 345/161 |
| 5,754,023 | * | 5/1998 | Roston et al. ....................... 318/561 |
| 5,754,189 | * | 5/1998 | Doi et al. ............................. 345/473 |
| 5,846,086 | * | 12/1998 | Bizzi et al. ........................... 434/247 |

FOREIGN PATENT DOCUMENTS

| | | |
|---|---|---|
| 0211984A1 | 3/1987 | (EP) . |
| 0545684A2 | 6/1993 | (EP) . |
| WO9218925 | 10/1992 | (WO) . |
| WO9508793 | 3/1995 | (WO) . |
| WO9511479 | 4/1995 | (WO) . |

* cited by examiner

Primary Examiner—Cliff N. Vo
(74) Attorney, Agent, or Firm—Gregory L. Thorne (57) ABSTRACT

A virtual body modelling apparatus and method models a users body in a virtual environment and animated to follow physical movements of the user. Stores (30,32) hold data defining the virtual environment as well as features of the virtual body representation, including sequences of virtual body motions (for example a walking sequence for the legs of the virtual body) which sequences are initiated in response to one or more predetermined physical movements by the user, and animated by a display generator (28) providing images of the virtual environment to the user. Various forms of feedback to the user are provided, including force feedback where the users physical movements are constrained in dependence on conditions within the virtual environment, visual feedback where the users viewpoint of the virtual world is modified as a sequence of body motions is executed, and audio feedback (62) such as the sound of footsteps triggered at predetermined points in the sequence of motions.

17 Claims, 4 Drawing Sheets

VIRTUAL BODY CONTROL DEVICE

BACKGROUND OF THE INVENTION

1. Field of the Invention

The present invention relates to a method and apparatus for controlling the movement of a virtual body, where the virtual body is a computer-based model that represents the human, or other, form in a computer-generated virtual environment.

The form taken by the virtual environment will depend on the intended use of the system and may, for example, comprise the interior of a building for an architectural modelling application, or urban or surreal landscapes for games or other applications, around which environment the virtual body controlled by the user is moved. In the following, the term "virtual environment" will be used for such virtual landscapes or situations: the term "physical environment" will be used to denote the 'real-world' surroundings of the user, for example a room in which the user contacts the various hardware devices, such as a head-mounted display (HMD), which provide the interface to the virtual environment.

The terms "virtual body" and "physical body" should be construed accordingly.

2. Description of the Related Art

One example of a control device in the form of a haptic glove is described in International Patent Application WO92/18925 (W. Industries). Within the virtual environment (viewed for example via HMD) the users hand appears as a cursor which undergoes changes corresponding with movement and flexure of the users hand. Contact between the cursor and objects within the virtual environment is simulated by inflating cushion portions of the glove to give a sensation of touch. Whilst the haptic glove is useful for techniques such as hands-on molecular modelling, within a virtual world where the object is to provide a sense of visual realism for the user, the changeable cursor (and the lack of the rest of a body) can detract from the users feeling of immersion.

A far more complex system, for generating and processing synthetic real-time environments is described in International Patent Application WO95/11479 (Redmond Productions). In the system described, the user is placed in a closed physical environment within which all the interaction occurs. On first use, a detailed virtual body for the user is built up, the process making use of detailed position sensing means within the physical environment to form a 'wire-frame' model of the users body. Onto the wire frame, the virtual body is built up to a high density image with shading and hidden surface removal using a library of stored male and female body parts of all shapes and ages. In order to provide stimuli to the user (in addition to stereo imaging and audio through an HMD), the closed chamber includes a number of interaction apparatuses including a variable resistance treadmill, tactile output devices (pixel-addressed banks of rods which can be pushed out to form shapes or surface textures) and a "cybercycle" vehicle simulator.

While this latter system may provide the user with a high degree of immersive realism, the processing power required to generate and animate the virtual body in addition to generating the virtual environment is extremely high.

SUMMARY OF THE INVENTION

It is therefore an object of the present invention to provide a system for modeling a virtual body within a virtual environment, and controlling the movements of the virtual body in response to user body movement, which system is relatively simple to implement while providing acceptable (or better) levels of realism.

It is a further object of the present invention to provide, in such a system, easily implementable mechanisms for supplying feedback from the virtual environment to a user.

In accordance with the present invention there is provided a virtual body modeling apparatus operable to generate and animate under user direction a representation of a body in a virtual environment. A first data store, holds data defining the virtual environment. A second data store, holds data related to features of the virtual body representation. A motion detector and a processor is arranged to generate a representation of the virtual environment based on data from the first data store, to generate the body representation within the virtual environment based on data from the second data store, and to periodically modify the generated body representation in response to signals received from the user motion detector. The second data store holds data defining at least one sequence of body motions, and the processor is arranged to call the sequence data and modify the generated body representation to follow the sequence of motions on detection of one or more predetermined signals from the user motion detector.

By the use of pre-stored sequences of body motions (for example a walking sequence for the legs or a waving sequence for an arm) the need to monitor user movements and update the generated image of the virtual body to exactly follow the users execution of these movements is greatly reduced. Different speed sequences may be provided for a given body motion, or means may be provided to control the speed at which a sequence is reproduced.

The apparatus may suitably include means operable to generate feedback to the user to enhance the realism, with the feedback being generated in relation to the following of the sequence of motions, and at one or more predetermined points in the sequence. Such feedback may take a number of forms, including force feedback where means may be arranged to provide controllably variable resistance to movement of the users physical body, such as to simulate difficult conditions in the virtual environment. Another possible form of feedback is audio feedback (for example the user hearing the sound of his/her footsteps in the virtual world) with the apparatus including audio signal generation means and the feedback comprising an audio sequence generated at a predetermined point or points during the sequence of motions. A still further form of feedback is visual feedback which may be provided where the user is presented with the image of the virtual environment from a first viewpoint, and the generated representation of the virtual environment is modified to change the viewpoint in synchronism with the following of the sequence of motions.

As will be described hereinafter in terms of an exemplary embodiment, the motion detector may comprise a restraint coupled to a rotatable shaft and attachable to a users limb, with movement of the restraint by the user producing rotation of the shaft and the user motion being derived from the angular deflection of the shaft. With such an arrangement, force feedback may be provided in the form of an electromagnetic coil or the like to generate a torque opposing rotation of the shaft.

Also in accordance with the present invention there is provided a method for user-directed animation of a computer-generated representation of a body in a virtual environment. An initial position for the virtual body is determined within the environment. An image of the virtual body within the environment and presenting it to a user. Movement of the user in a physical environment is monitored and translated into movement of the virtual body relative to the virtual environment. The rendered and presented image is periodically updated. At least one pre-stored sequence of body motions is provided, and the generated body representation is modified to follow the sequence of motions on detection of one or a predetermined sequence of physical motions by the user. The rate of modification of the generated body representation may suitably be determined by a filtered (for example time averaged) value for speed of user movement, to result in a smooth movement of the virtual body, unaffected by short hesitations or the like on the part of the user.

BRIEF DESCRIPTION OF THE DRAWINGS

Further features and advantages of the present invention will become apparent from reading of the following description of preferred embodiments of the invention, by way of example only, and with reference to the accompanying drawings, in which.

DESCRIPTION OF THE PREFERRED EMBODIMENTS

The following description is specifically concerned with modeling and controlling the legs of a virtual humanoid body that a user or participant in a virtual world may control, with the mechanism for control of the leg movements of the virtual body being directed by measured movement of the users legs. As will be readily appreciated, many of the techniques described may also be used for controlling movement of the arms and head of a virtual body.

Figure 1:
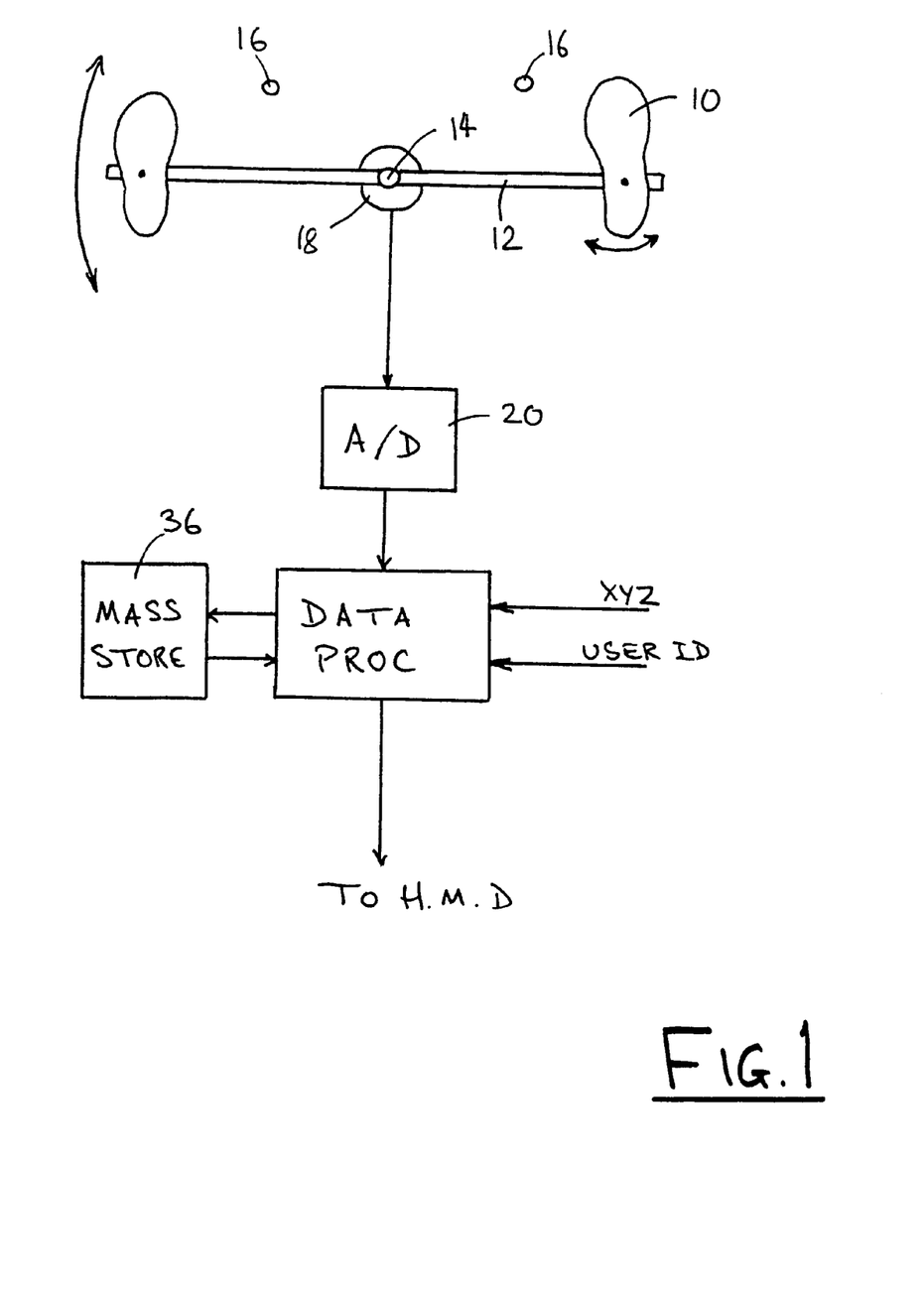
FIG. 1 is a plan view of a foot axial motion measurement device.

The arrangement for measuring the movement of the human legs is via an apparatus which translates the current physical position of at least one point on the users legs into a measurement appropriate for input to a data processor. A first embodiment of such an apparatus is shown in FIG. 1 and comprises an arrangement of footrests 10 pivotally connected to opposite ends of an arm 12, which arm is connected to a perpendicular central shaft 14, such that the left and right footrests may be rotated about an axis along the shaft 14. Stops 16 limit the extent of rotation and the degree of rotation of the shaft 14 around its axis is measured by means of a potentiometer 18 which provides a variation in current or voltage with rotation that then may be passed via an appropriate analogue-to-digital (A/D) converter 20 providing a digital signal representative of the deflection for input to a data processor 22. Other inputs to the processor 22 may be provided for input from mass storage 36 (e.g. CD-ROM), additional user positioning data (XYZ), and identification codes (USER ID).

As will be understood, other angular position sensing means may be used in preference to the potentiometer to generate a deflection signal for supply to the data processor.

It will also be recognized that, whereas the above system of measurement gives a single value at each measured instant for both the left and right legs, the position of each leg might be measured independently.

Figure 2:
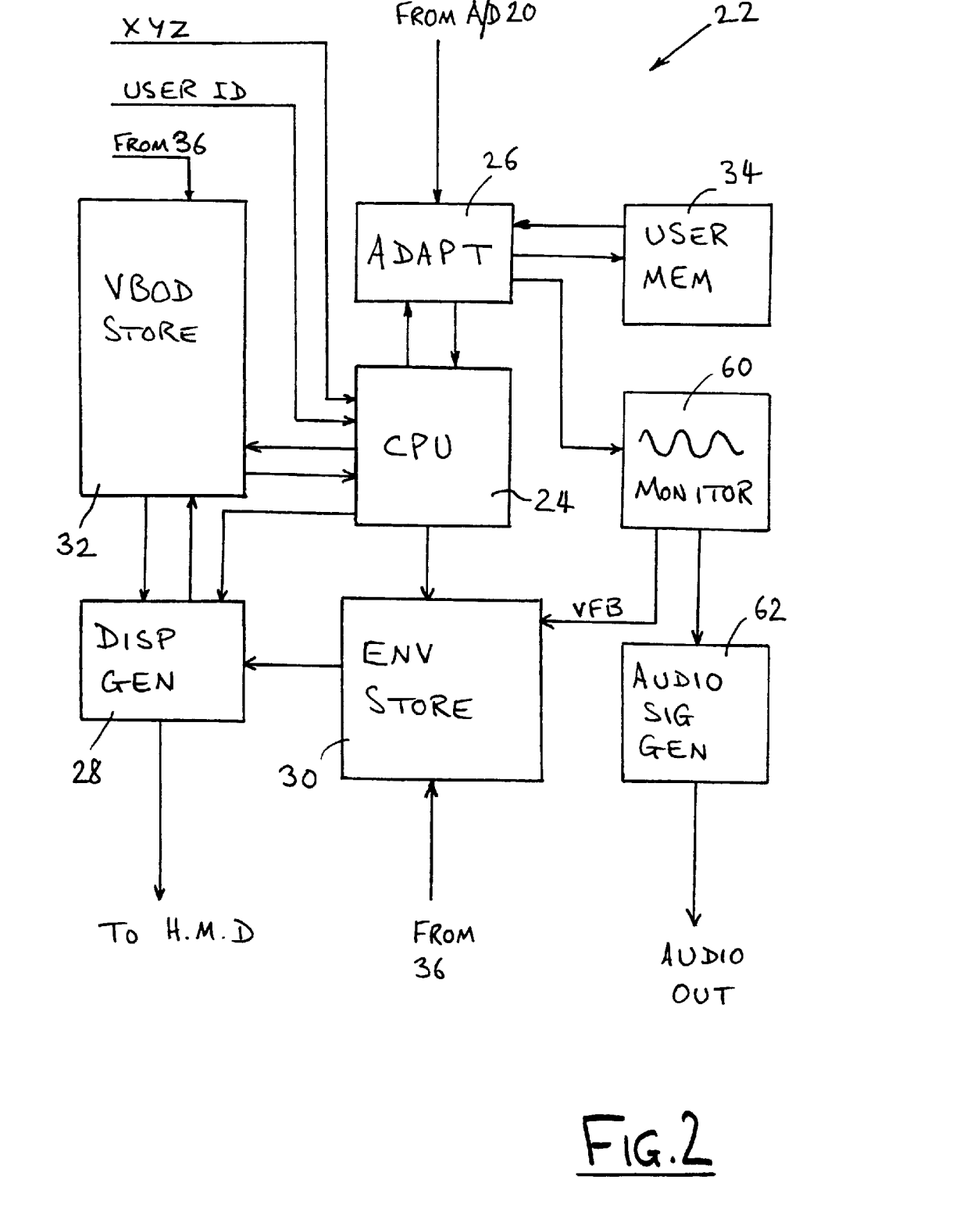
FIG. 2 represents a first data processor arrangement for translation of direct measurement to virtual body motion.

Once this measurement relative to the human leg positions has been made, it must next be translated into a walking motion of the virtual body. The translation is carried out by the data processor 22 which, as shown in FIG. 2, is based around a central processor unit (CPU) 24 which receives the digitized rotational measurement from the A/D converter 20 (FIG. 1), optionally via an adaptive mechanism 26 to be described. Generation of the virtual environment is handled by a display generator stage 28 under direction of the CPU 24 and using data from an environment data store 30. This data store 30 may be of limited size (to allow fast access) holding only the data describing the area of the environment where the virtual body is currently situated. This data store 30 may be updated from mass store 36 (FIG. 1).

The current user position and orientation in respect of the virtual world may optionally be based on external inputs XYZ from position sensors monitoring user movement or, in a simpler implementation, the height of the user viewpoint within the virtual environment may be substantially fixed, with the horizontal location and orientation for the virtual body being determined relative to a set starting position purely on the basis of the input from the rotation sensor 18 of FIG. 1.

A first method for simulation of the walking motion of the legs is to use a mathematical model of walking human legs (held in a store VBOD 32 of the data processor 22) from which the CPU 24 derives the actual position and orientation of each of the joints of the virtual leg within the virtual environment from the position of the users foot or leg (based on the rotary measurement) within the physical environment. For example, with the apparatus of FIG. 1, the feet (and hence the ankle joints) follow a constrained path. The mathematical model may suitably specify movements in relation to an origin point (the location of which may be specified from input XYZ) such as the center of the pelvis. There may be some rotation of the hip joints about the origin point specified or allowed for in the model and the movement of the legs is defined by the relative positions of the hip and ankle joints, the lengths of the upper and lower leg, and the maximum permitted range of relative movement of the parts about the joints in two or three dimensions.

From the determined relative positions of the leg components, the display generator 28 generates a representation of the legs as they appear in the virtual environment, suitably on the basis of additional data from the VBOD store 32 specifying the appearance of the individual components.

An alternative method uses a stored sequence held in the VBOD store 32 (instead of the mathematical model) which sequence is composed of a set of frames of possible leg positions for display within the virtual environment by the display generator 28. When cycled through, the sequence of frames give the appearance of a walking motion. A number of such sequences might be held in the VBOD store 32, representing various walking speeds, with the CPU 24 selecting which is to be used on the basis of the input from the apparatus of FIG. 1. Alternatively, where a single sequence is held, the display generator 28 may be controlled to selectively drop frames to give the appearance of something walking faster, or selectively repeat frames for slower walking. Interpolation between frames to give a smoother walking action may also be provided where the display generator has the capability.

A first method for achieving the translation between physical measurements such as the output from the potentiometer 18 of FIG. 1 and action in the virtual world is to directly map the measured or derived position of the human legs onto a representation of the virtual human legs, which may be chosen via either of the two methods described above—that is to say deriving the current virtual leg model from a mathematical model, or choosing the most appropriate leg model from a pre-stored set or sequence of such models. A possible problem with this approach lies in the action of individual users when exposed to the measurements. Some users will make strong walking motions, while other users will make weak shuffling motions, and some users may stop for short periods of time. This can translate into an erratic appearance to the walking motion of the virtual body.

In order to improve this approach, adaptive mechanism 26 is included at the positional measurement input to the CPU 24 as shown in FIG. 2. This mechanism adapts on the fly to the measurement apparatus output, to translate the users erratic, variable measurements into a steady walking motion. Any of a number of adaptive mechanisms, such as adaptive filters and neural networks, may be used. In operation, the physical movement corresponding to putting a particular foot on the ground may be used as a key, with the generated or modeled sequence of virtual leg motions taking its timing from the key regardless of what irregular motions the user legs may make between keys. Certain irregularities or features of a particular users walking action (for example whether the user has a limp or takes relatively short steps) may suitably be learned by the adaptive mechanism 26 and these adaptive mechanism settings (what it has learned about the current user) may be stored in a user memory 34, and recalled when the CPU 24 determines from a USER ID signal that the particular user has access to the system once again.

Figure 3:
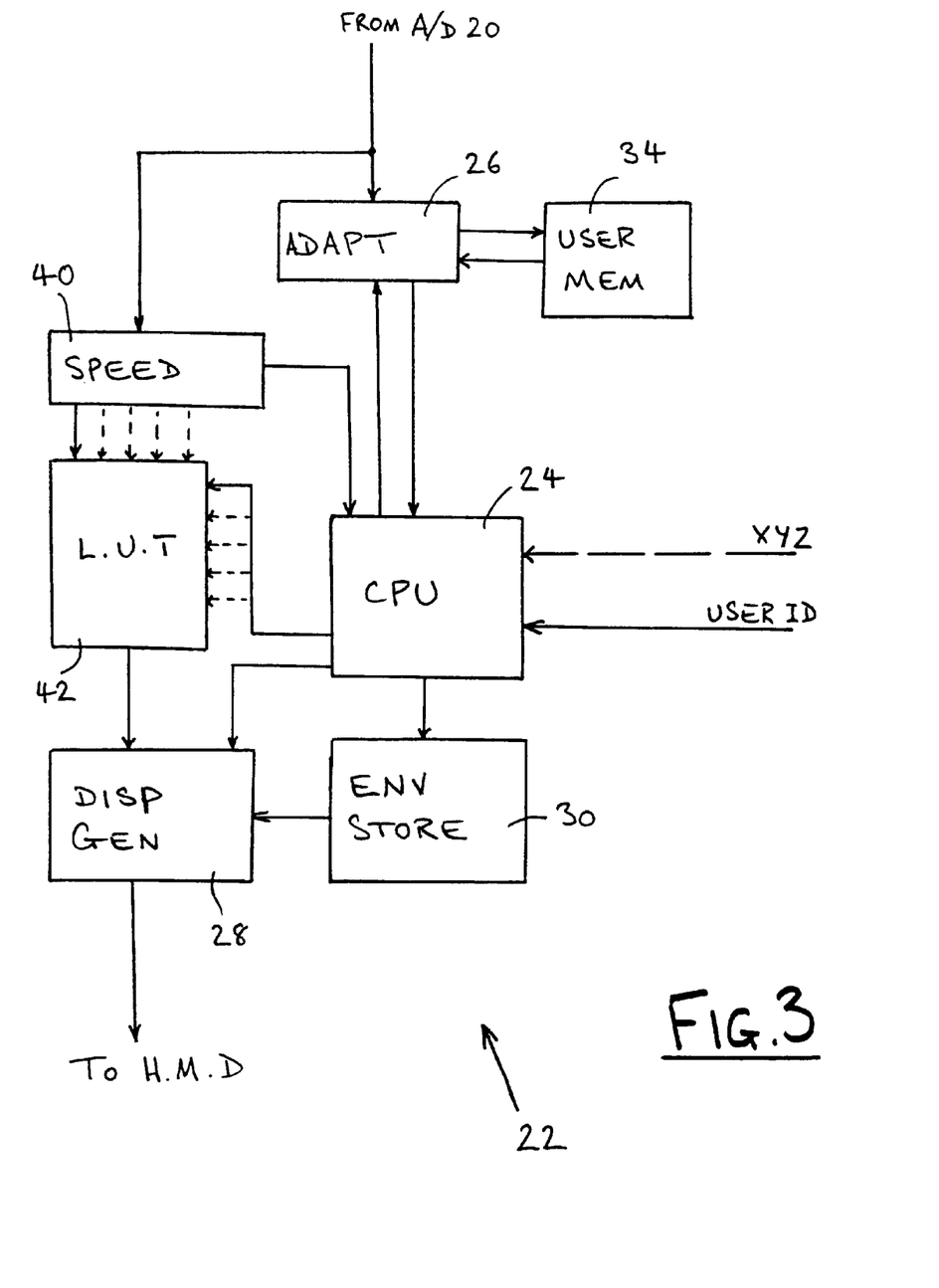
FIG. 3 represents an alternative data processor arrangement for the translation of indirect measurement to virtual body motion.

An alternative to the above technique is an indirect approach as shown in FIG. 3. Those features performing the same function as in FIG. 2 are identified by the same reference numeral and will not be described again. In FIG. 3, the input from the user measurement device of FIG. 1 is passed to an arithmetic stage 40 which derives measures of speed and acceleration based on the input users walking motion. These measures of speed and acceleration are then translated, via some prespecified relationships into a speed for the walking virtual body. This speed of the virtual body is then passed via the CPU 24 to the display generator 28 where it is used to determine movement of the user viewpoint within the virtual environment, and also to calculate the positions of the legs for the virtual body. In the case of the above-described technique using a number of pre-stored sequences of animations representing a walking motion, the calculated speed from stage 40 is used to determine the offset into a look-up table 42 that indicates which sequence should be used at the current speed, with the derivations of the leg position from CPU 24 determining the state of the walking process. It may also be desirable to have the adaptive mechanism 26 in place in this system, as for the direct approach described above.

In order to enhance the user-perceived realism of the virtual environment in which the user is walking, force feedback may be provided to the user. The purpose of the force feedback is to make it harder or easier for the user to move in the physical environment. For example, where leg movements are being measured, a mechanism may be provided which can act against, or inhibit, the users physical leg movements. Such feedback would be useful to give the impression of tiring or weakening, or of walking over a more demanding environment or uphill.

Figure 4:
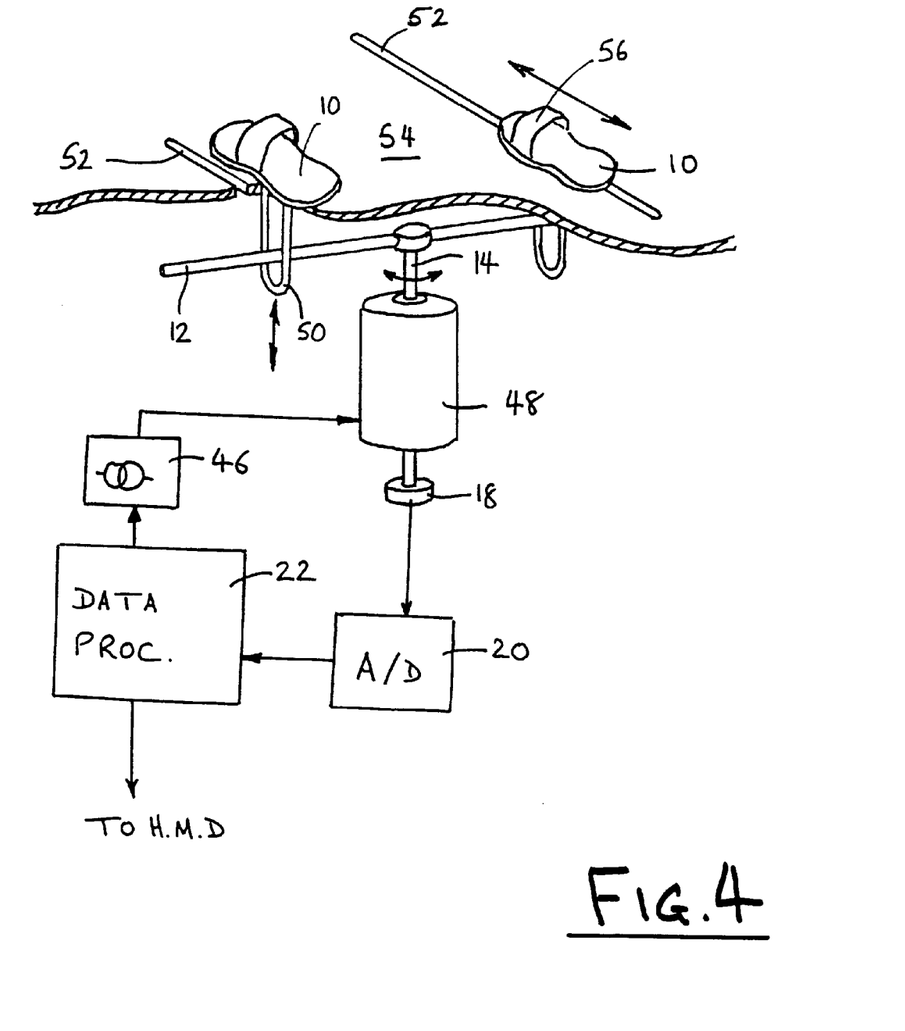
FIG. 4 is an alternative configuration of foot axial motion measurement device enabled to provide force feedback to the user.

An example means of providing force feedback to a users legs, with reference to a modified version of the mechanical measurement system described with reference to FIG. 1, is shown in FIG. 4. The data processor 22 running the simulation controls a variable current source 46. The shaft 14 on which the measurement device is mounted also comprises the rotor of an electromagnetic device 48, arranged such that when a current is supplied to the device 48 from the current source 46, it requires a greater force to rotate the shaft 14 around its axis. Thus the data processor 22 may vary the current to provide a greater or lesser degree of inhibition to the users physical walking motion.

The arrangement of FIG. 4 also enables the user to adopt a more natural walking style than that of FIG. 1, with the footrests 10 constrained to run along respective parallel paths by loop portions 50 descending from each footrest through a respective slot 52 in a horizontal platform 54. The underside of each footrest 10 may be provided with rollers, or low friction materials may be used for the sole of the footrests 10 and the upper surface of the platform 54. The lower part of each loop portion 50 receives a respective end of the arm 12, with the pivot axis of the arm (the axis of shaft 14) being set midway between the slots 52 and halfway along their length.

By use of elongate loop portions 50, together with straps 56 across the top of each footrest 10, the user may lift his/her feet while executing the walking motion, rather than being required to adopt the 'skiing' technique required by the apparatus of FIG. 1. As will be recognized, the arrangement of FIG. 4 will exaggerate (in terms of the output signal) the usual tendency for the foot to be moving fastest midway through a stride. This exaggeration may suitably be compensated for by the CPU or the adaptive mechanism of the data processor 22.

Returning to FIG. 2, as a means of enhancing the perceived realism, the viewpoint of the user (when it coincides with a view seen from the virtual walking character) may be modulated in relation to the walking action. A simple means to implement this is for the adaptive mechanism 26 to evaluate a sine function based on averaged or key user inputs (as described above), with the amplitude of the sine function being a measure of the state of the walking motion, and the measure being periodic with relation to a footstep. This sine function is supplied to a monitor stage 60 and a proportion of the value of the sine function from the monitor stage is then added to the viewpoint and direction via the environment data store 30 as shown (signal VFB) or via the CPU 24, to give the appearance of up/down/sideways movement of the field of view as is experienced when walking in the real world. The sine function (or other means of providing a suitable periodic measurement suitable for input to the viewpoint/direction) may instead be stored in a look-up table and indexed at key points in the users movement cycle, rather than being locally generated.

Another form of feedback supported is audio cues to provide an additional sense of immersion and feedback to the user. In order to generate the sound of footsteps for example, an event driven approach may be used. Here a footstep sound is generated by audio signal generator 62. The sound is triggered twice during each cycle through a walking motion (once for each foot). This corresponds to once per cycle for the sine wave from monitor circuit 60 on the basis of which the viewpoint is changed. In the system described here, a measurement of the human walking motion may be used not only to initiate a number of different techniques for rendering of the users virtual limbs in the virtual environment, but also to trigger and direct force, and to provide visual and audio feedback to the user.

From reading the present disclosure, other modifications and variations will be apparent to persons skilled in the art. Such modifications and variations may involve other features which are already known in the art and which may be used instead of or in addition to features already described herein. Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applicants hereby give notice that new claims may be formulated to such features and/or combinations of such features during prosecution of the present application or of any further application derived therefrom.

What is claimed is:

1. Virtual body modeling apparatus operable to generate and animate under user direction a representation of a body in a virtual environment, said apparatus comprising:

a first data store, holding data defining the virtual environment;

a second data store, holding data related to features of a virtual body representation;

user motion detector to detect user body motion; and a processor arranged to generate a representation of the virtual environment based on data from the first data store, to generate the virtual body representation within the virtual environment based on data from the second data store, and to periodically modify the generated virtual body representation in response to the detected user body motion, said second data store holding sequence data defining at least one sequence of virtual body motions; and said processor being arranged to call said sequence data and translate the detected user body motion using said sequence data, wherein the generated virtual body representation is modified to follow the detected user body motion.

2. Apparatus as claimed in claim 1, further comprising means operable to generate feedback to the user, said feedback being generated in relation to a sequence of virtual body motions, and at one or more predetermined points in the sequence.

3. Apparatus as claimed in claim 2, further comprising force feedback means arranged to provide controllably variable resistance to movement of the users physical body.

4. Apparatus as claimed in claim 2, including audio signal generation means, wherein the feedback is an audio sequence generated at a predetermined point or points during the sequence of virtual body motions.

5. Apparatus as claimed in claim 1, wherein the user is presented with the image of the virtual environment from a first viewpoint, said generated representation of the virtual environment being modified to change the viewpoint in synchronism with the following of the sequence of virtual body motions.

6. Apparatus as claimed in claim 1, wherein the motion detector comprising a restraint coupled to a rotatable shaft and attachable to a users limb, wherein movement of the restraint by the user produces rotation of the shaft and the detection of the user motion is derived from the angular deflection of the shaft.

7. Apparatus as claimed in claim 6, further comprising force feedback operable to generate a torque opposing rotation of the shaft.

8. Apparatus as claimed in claim 1, wherein:

the second data store holds data defining a plurality of sequences of virtual body motions in respective areas of a look-up table;

the processor is configured to derive a speed value from the input from the user motion detector:

said speed value is used to index the look-up table, wherein the speed of the virtual body motion follows the derived speed value.

9. A method for user-directed animation of a computer-generated representation of a body in a virtual environment, comprising the steps of:

determining an initial position for the virtual body within the environment, rendering an image of the body within the environment, and presenting the image to a user;

monitoring movement of the user in a physical environment and translating said movement into movement of the virtual body relative to the virtual environment; and periodically updating the rendered and presented image, at least one pre-stored sequence of virtual body motions being provided, and the generated body representation being modified using the pre-stored sequence of virtual body motions wherein motion of a particular user body portion results in motion of a corresponding virtual body portion.

10. A method as claimed in claim 9, wherein a rate of movement of the generated virtual body representation is determined by a filtered value for a determined speed of user movement.

11. A virtual body modeling apparatus for generating and animating in response to user movement a representation of a body in a virtual environment, said apparatus comprising:

a first data store configured to hold data defining the virtual environment;

a second data store configured to hold sequence data defining at least one sequence of virtual body motions;

a user motion detector configured to detect user body motion corresponding to movement of a particular user body portion; and a processor configured to generate a representation of the virtual environment based on data from the first data store, to generate the virtual body representation within the virtual environment based on data from the second data store, and to call said sequence data and translate the detected user body motion using said sequence data, wherein the movement of the particular user body portion produces movement of a corresponding body portion of the generated virtual body representation.

12. The apparatus of claim 11, wherein said motion detector is configured to detect the speed of user body motion and said processor is configured to translate the detected speed of user body motion into a corresponding speed of motion of the corresponding body portion of the generated virtual body representation.

13. The apparatus of claim 12, wherein the second data store is configured as a look-up table to hold a plurality of sequences of virtual body motions that correspond to a plurality of speeds of motion of virtual body portions, and wherein said processor is configured to use the detected speed of the user body portion as an index for retrieving a particular one of the plurality of sequences of virtual body motions.

14. The apparatus of claim 11, further comprising a force feedback generator configured to provide force feedback to the user in response to the generated virtual environment.

15. The apparatus of claim 14, wherein the motion detector comprises the force feedback generator.

16. The apparatus of claim 15, wherein:

the motion detector comprises a restraint coupled to a rotatable shaft, attachable to the user's body portion, and configured to translate movement of the restraint by the user into rotation of the shaft;

the processor is configured to detect the user body motion by detecting the degree of rotation of the shaft; and the force feedback generator configured to generate a torque opposing rotation of the shaft.

17. The apparatus of claim 11, wherein:

the motion detector comprises a restraint coupled to a rotatable shaft, attachable to the user's body portion, and configured to translate movement of the restraint by the user into rotation of the shaft; and the processor is configured to detect the user body motion by detecting the degree of rotation of the shaft.

* * * * *

UNITED STATES PATENT AND TRADEMARK OFFICE
CERTIFICATE OF CORRECTION

| | | |
|---|---|---|
| PATENT NO. | : 6,285,379 B1 | Page 1 of 1 |
| APPLICATION NO. | : 08/764701 | |
| DATED | : September 4, 2001 | |
| INVENTOR(S) | : Richard D. Gallery | |

It is certified that error appears in the above-identified patent and that said Letters Patent is hereby corrected as shown below:

Col. 7, lines 24-46 should read,

What is claimed is:

1. A virtual body modeling apparatus for generating and animating under user direction a representation of a body in a virtual environment, said apparatus comprising:

a first data store configured to hold data defining the virtual environment;

a second data store;

a user motion detector to detect user body motion; and a processor arranged to generate a representation of the virtual environment based on data from the first data store, to generate the virtual body representation within the virtual environment based on data from the second data store, and to periodically modify the generated virtual body representation in response to the detected user body motion;

said processor being arranged to call said sequence data and translate the detected user body motion using said sequence data, wherein the generated virtual body representation is modified to follow the detected user body motion.

Signed and Sealed this
Third Day of January, 2012

David J. Kappos
*Director of the United States Patent and Trademark Office*

UNITED STATES PATENT AND TRADEMARK OFFICE
CERTIFICATE OF CORRECTION

PATENT NO. : 6,285,379 B1  
APPLICATION NO. : 08/764701  
DATED : September 4, 2001  
INVENTOR(S) : Richard D. Gallery Page 1 of 1

It is certified that error appears in the above-identified patent and that said Letters Patent is hereby corrected as shown below:

In the claims, column 7, line 24, change the text beginning with "1. Virtual body modeling apparatus" to and ending "body motion." in column 7, line 46, and insert the following claim:

-- 1. A virtual body modeling apparatus for generating and animating under user direction a representation of a body in a virtual environment, said apparatus comprising:
    a first data store configured to hold data defining the virtual environment;
    a second data store configured to hold sequence data defining at least one sequence of virtual body motions;
    a user motion detector to detect user body motion; and
    a processor arranged to generate a representation of the virtual environment based on data from the first data store, to generate the virtual body representation within the virtual environment based on data from the second data store, and to periodically modify the generated virtual body representation in response to the detected user body motion;
    said processor being arranged to call said sequence data and translate the detected user body motion using said sequence data, wherein the generated virtual body representation is modified to follow the detected user body motion. --.

In the claims, column 7, line 54, change the text "of the users" to "of a users".

In the claims, column 8, line 12, change the text "detector;" to "detector; and".

This certificate supersedes the Certificate of Correction issued January 3, 2013.

Signed and Sealed this  
Twenty-ninth Day of January, 2013

David J. Kappos  
*Director of the United States Patent and Trademark Office*